Jan. 13, 1942.  J. STOECKER ET AL  2,269,699
FUEL BURNER FOR AIR HEATING APPARATUS
Filed May 23, 1938
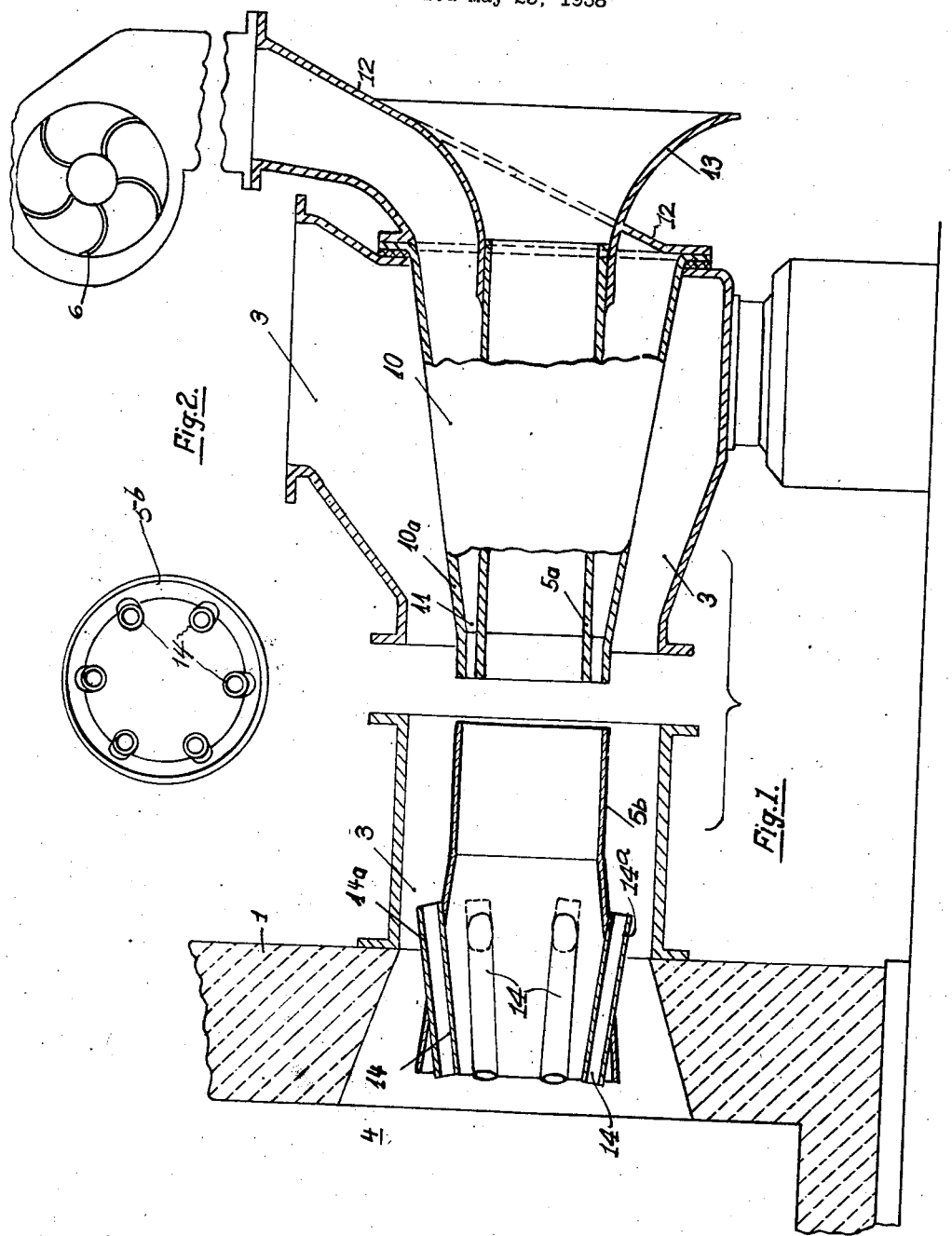
Inventors
Julius Stöcker
Arthur Rein
By A. D. Adams
Attorney Patented Jan. 13, 1942

2,269,699

UNITED STATES PATENT OFFICE 2,269,699

FUEL BURNER FOR AIR HEATING APPARATUS

Julius Stoecker and Arthur Rein, Bochum, Germany; Hildegard Stoecker, née Grabemann, sole heiress of Julius Stoecker, deceased, assignors to Askania-Werke A. G., a corporation of Germany Application May 23, 1938, Serial No. 209,616
In Germany March 25, 1937

1 Claim. (Cl. 158—109)

The invention relates to fuel burners for air heating apparatus, such as Cowper-towers and the like. More particularly the invention aims to provide a fuel burner which enables easy replacement of the burner parts as well as a reliable observation and easy accessibility from the outside.

Furthermore, the invention aims to remove the disadvantage of the well known burners due to a mixing chamber provided to mix the gas and the combustion air before entering the fire room of the Cowper-tower.

A still further object of the invention is to provide a burner in which the tube supplying the combustion air is protected against excessive heating.

These and other advantages and objects of the invention will now be fully explained with reference to the accompanying drawing showing an embodiment of the invention for illustrative purposes.

Referring to the drawing:

Fig. 1 is a longitudinal sectional view of a modified form of burner.

Fig. 2 is an end view of the inner tube shown in Fig. 1.

The well known fuel burners comprise two pipes or tubes, one within the other, one tube supplying the gas as fuel and the other combustion air. In these burners the gas supplying tube or pipe is arranged within the air supplying tube so that changing of the burner parts as well as observation and accessibility from outside are rendered difficult. Furthermore, the well known burners of this type are provided with a mixing chamber adapted to mix gas and air before igniting in the fire chamber or shaft of the Cowper-system. Such mixing chambers are inclined to cause "puffing" or back-firing. Since the inner gas tube projects into the Cowper-tower, the projecting end of said tube is endangered by excessive heating and, therefore, burning.

The fuel burner is mounted on the wall 1 of the Cowper-tower. A gas tube is connected to the outer annular channel 3 and flows into the shaft 4 of the Cowper-tower. The combustion air is supplied by an inner tube 5a—5b communicating with the tower 4 so that the gas and air cannot mix before entering the tower. A preliminary mixing of gas and air in a more or less extended mixing chamber as is the case with the well known fuel burners is, therefore, not possible, such a mixing chamber causing back-firing. The inner air tube 5a—5b is provided with a pressure supplying means, such as a vane blower 6 driven by a motor.

As shown in Fig. 1 the vane blower 6 and its driving motor are provided above the burner so that a view into the burner and the accessibility from outside are in no way hampered. The outer part 5a of the air tube is surrounded by an annular channel 10, around which is the second annular channel 3 for gas. The annular channel 10 is provided with the blower 6 or the like, the air flowing out of the annular section 11 creating a suction of additional air through the inner tube 5a. The inner end 10a of the annular air channel 10 is cylindrically formed so as to avoid converging of the air flow passing through the annular air channel. For connecting the blower or the like to the annular air channel 10 an elbow fitting 12 is provided, the outer wall of said elbow having a hole for inserting the inner air tube 5a.

In such an embodiment the danger exists that in the lower part of the annular air channel the velocity of the flow is greater than in the upper part due to the deflection of the flow in the elbow, while it is naturally desirable that the velocity be equal at all points of the circumference of the annular channel 10. According to the invention, this is attained if the cross-section of the elbow 12 becomes smaller at the outer side, i. e. in case of Fig. 1 at the side which enters the lower part of the annular channel 10.

To simplify the mounting as well as the maintenance and observation of the burner the elbow 12 and the funnel shaped mouthpiece 13 of the inner air tube 5a are combined into one element, e. g. out of cast-iron, adapted to be easily fastened to the burner from the outside as shown. The outer part 5a of the inner air tube and the annular air channel 10 surrounding same are constructed of sheet-metal in such a way that these parts may, likewise, be easily fastened to the burner after being inserted into the gas channel 3.

It is advantageous to insure that a part of the outer gas flow projects into the air flow at the end of the air supplying pipe next to the shaft of the Cowper-tower.

According to Fig. 1, the part 5b of the air supplying pipe is provided with several small tubes 14 acting as gas conducting channels and being distributed around its circumference, as shown in Fig. 2, the rear ends 14a of said tubes projecting into the gas channel and these tubes converge in the direction of the flow so that the part, branched off from the main gas stream, passing through these tubes, enters the air stream with a radially moving component. A mixing of the air and gas before entering the tower is achieved to a certain degree by means of these conducting tubes. In this way the danger of "puffing" is avoided which is not the case with open mixing chambers. The mixing beforehand by means of the conducting tubes has the advantage that the gas mixture ignites earlier in the tower than without said pre-mixing and thereby sufficiently heats the lower part of the shaft.

Obviously, the present invention is not restricted to the particular embodiment thereof herein shown and described. Moreover, it is not indispensable that all the features be used conjointly, since they may be employed advantageously in various combinations and sub-combinations.

What is claimed is:

In a gas burning furnace having a combustion chamber, a gas burner comprising an outer gas tube and a main inner air tube for passing gas and air separately through the burner, said main inner air tube having an additional air tube extending within and coaxially with the main air tube outwardly from the burner with an open outer end to provide a "sight" tube for the burner to permit an unobstructed view through said additional tube into the burner, and fan means arranged to force air through the main inner air tube and to induce air flow through the additional air tube into the burner.

JULIUS STOECKER.
ARTHUR REIN.